(12) United States Patent
Stöppelmann et al.

(10) Patent No.: US 6,284,334 B1
(45) Date of Patent: Sep. 4, 2001

(54) MULTI-LAYER THERMOPLASTIC COMPOSITES

(75) Inventors: Georg Stöppelmann, Bonaduz; Manfred Hewel, Rodels, both of (CH)

(73) Assignee: EMS-Inventa AG, Zurich (CH)

( * ) Notice: Subject to any disclaimer, the term of this patent is extended or adjusted under 35 U.S.C. 154(b) by 0 days.

(21) Appl. No.: 09/218,815

(22) Filed: Dec. 22, 1998

(30) Foreign Application Priority Data

Dec. 23, 1997 (DE) .............................. 197 57 606

(51) Int. Cl.$^7$ .................... B28D 22/00; B28D 23/00; B32B 1/08
(52) U.S. Cl. ................. 428/36.9; 428/36.91; 428/476.3; 428/477.4; 428/524
(58) Field of Search .............. 428/477.4, 476.3, 428/524, 36.9, 36.91

(56) References Cited

U.S. PATENT DOCUMENTS

| | | | |
|---|---|---|---|
| 2,071,250 | 2/1937 | Carothers | 526/71 |
| 2,071,251 | 2/1937 | Carothers | 524/31 |
| 3,799,899 | 3/1974 | Feinauer et al. | 528/318 |
| 4,207,410 | 6/1980 | Burzin et al. | 528/288 |
| 4,839,437 | 6/1989 | Gergen et al. | 525/426 |
| 4,843,144 * | 6/1989 | Broekhoven | 528/392 |
| 4,874,825 | 10/1989 | Gergen | 525/425 |
| 4,880,903 * | 11/1989 | Broekhoven | 528/392 |
| 5,175,210 | 12/1992 | Machado | 525/64 |
| 5,237,786 * | 8/1993 | Waters | 428/425.8 |
| 5,300,338 | 4/1994 | Byrd, Jr. et al. | 428/36.6 |
| 5,418,068 | 5/1995 | Caluori et al. | 428/474.4 |

FOREIGN PATENT DOCUMENTS

| | | |
|---|---|---|
| 2 152 194 | 10/1971 | (DE) . |
| 27 12 987A | 3/1977 | (DE) . |
| 0 457 374 A2 | 2/1991 | (EP) . |
| 0 569 101 A1 | 5/1993 | (EP) . |
| WO 96/18686 | 6/1996 | (WO) . |

* cited by examiner

Primary Examiner—Leszek Kiliman
(74) Attorney, Agent, or Firm—Kinney & Lange, P.A.

(57) ABSTRACT

The invention relates to novel thermoplastic multi-layer composites comprising at least a) a layer formed from a molding compound based on a polyamide and b) a second layer formed from a molding compound based on a linear alternating polyketone polymer from carbon monoxide and an ethylenically unsaturated hydrocarbon compound, at least part of which layer b) is adjacent to layer a).

30 Claims, No Drawings

MULTI-LAYER THERMOPLASTIC COMPOSITES

BACKGROUND OF THE INVENTION

The present invention relates to multi-layer thermoplastic composites.

Polyamides (hereinafter abbreviated to PA) generally have good mechanical properties, in particular high strength, but also exhibit a poor barrier effect; thus polar substances can easily migrate through polyamides. This constitutes a major problem for fuel lines, for example, in which alcohol-containing felt is transported.

Ketone resins are formed from alkaline-catysed self condensation of ketones cyclohexanone, methylcyclohexanone), or from co-condensation of ketones (acetone, butanone, acetophenone, cyclohexanone, methylcyclohexanone) with formaldehyde-producing, non-saponifiable and neutral reacting resins (synthetic resins) of light colour and softening ranges of 80–130 C. Co-condensates of ketones (e.g., cyclohexanone) with long chain aldehydes are of no technical significance. The ketones can be divided into acetone, acetophenone resins, etc., depending ion the starting ketone. Ketones from mixtures of different ketones are also known.

Polyketone polymers (hereinafter abbreviated to PK) are known in the art. As an example, United States patent U.S. Pat. No. 4,880,903 describes linear alternating polyketone terpolymers based on carbon monoxide, ethylene and other olefmically unsaturated hydrocarbons such as propylene.

U.S. Pat. No. 4,843,144 describes a process for the production of linear alternating polyketone-polymers from carbon monoxide and at least one ethylenically unsaturated hydrocarbon, employing palladium catalysts.

Other aliphatic polyketones based on ethylene, carbon monoxide and propylene have been described, for example in European patents EP-A-0,457,374 and EP-A-0,569,101, and are sold under a variety of trade names.

U.S. Pat. No. 5,232,786 describes multi-layer structures containing aliphatic polyketones and polyamides. The individual layers are, however, only mechanically bonded and characterized in that the individual layers can easily be separated by hand. In practice, in particular when used in car manufacturing in which hoses and pipes are constantly in contact with fuiels, a permanent bond which cannot be separated by external influences is required. U.S. Pat. No. 5,232,786 describes a terpolymer based on PA6, PA66 and PA12, which inseparably bonds to the polyketone. Copolymers, however, have the disadvantage of having low melting points, low crystallinity and poor crystallisability, which results in reduced resistance to gasoline and slow processing.

EP-A-0,569,101 describes multi-layer systems of polyketone polymers (PK) and polyamides (PA) which contain polymerised-in units of hexamethylenediamine and adipic acid. However, the layers in pipes manufactured from the two materials can be separated by hand. Such bond strengths are not suitable when making pipes and hoses specifically for transporting fuel. The swelling stress caused by contact with gasoline then leads to delamination of the layers.

Composite materials from polyamide and polyketone polymers with adhesively bonded layers are not so far known. The prior art only indicates the use of binding agents or compatibilising layers between layers of polyamides and polyketone which produce an adhesive bond. An adhesively bonded thermoplastic multi layer composite is vital for technical use, for example in automobile hoses.

The aim of the invention is thus to provide thermoplastic multi-layer composites in which for the first time, a polyamide layer is adhesively bonded to a polyketone layer.

SUMMARY OF THE INVENTION

The present invention includes a thermoplastic multi-layer composite having a first layer that includes a first moulding compound and a second layer that includes a second moulding compound, with at least part of the second layer located adjacent and adhesively bonded to at least part of the first layer. In the thermoplastic multi-layer composite, the first moulding compound is based on a polyamide that has a ratio of amino to carboxyl end groups greater than 1, and, the second moulding compound is based on a linear alternating polyketone that is based on carbon monoxide and an ethylenically unsaturated hydrocarbon compound. The present invention further includes a use of the thermoplastic multi-layer composite.

DETAILED DESCRIPTION OF THE PREFERRED EMBODIMENTS

The invention provides a thermoplastics multi-layer composite according to claim 1, which comprises at least a layer a) formed from a moulding compound based on a polyamide and b) a second layer formed from a moulding compound based on a linear alternating polyketone polymer from carbon monoxide and an ethylenically unsaturated hydrocarbon compound which is adjacent at least in part to layer a). The special polyamide of the invention, which has a ratio of amino to carboxyl groups of more than 1, for the first time enables polyamides to be adhered to polyketone layers without bonding agent layers therebetween.

The dependent claims define advantageous embodiments of the invention.

The multi-layer composite can also be in the form of a hose or pipe line (claim 13). In this case, the PK layer forms the inner layer. At least one PA layer is adjacent it. Aliphatic mono- and co-polymers can be used for the polyamides in layer a). Examples are PA6, PA66, PA612, PA8, PA88, PA9, PA11, PA12, PA1212, PA1012, PA1112 and the like The polyamide reference is in accordance with international standards, in which the first number(s) represents the number of carbon atoms of the starting diamine and the last number(s) represent the number of carbon atoms in the dibasic carboxylic acid. If only one number is given, this means that the starting material is the a, (o-aminocarboxylic acid or the lactam derived therefrom.

When copolymers are used, these can contain adipic acid, sebacic acid, suberic acid, isophthalic acid, or terephthalic acid as co-acids, or (4'-aminocyclohexyl) methane, trimethylhexamethylenediamine, hexamethylenediamine or the like as the co-diamine.

The preparation of this co-polyamide is described, for example, in German patent DE-A-2 152 194.

Mixed aliphatic/aromatic polycondensates, such as those described in U.S. Pat. No. 2,071,250, U.S. Pat. No. 2,071, 251 etc., are also suitable polyamides. Poly (etheresteramide)s and poly(etheramide)s are also suitable polycondensates for the polyamide. Products of this type are described in DE-A-2,712,987, for example.

If necessary, the polyamides can be impact resistant. Examples of suitable modifiers are ethylene/propylene or ethylene/propylene-diene-copolymers or impact resistance producing rubbers.

The polyketone contained in the multi-layer composite of the invention has the following general formula I:

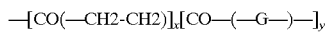

$$-[CO(-CH2-CH2)]_x[CO-(-G-)-]_y$$

where G is derived from an α-olefin monomer containing at least 3 carbon atoms, bonded together with at least one or more ethylenically unsaturated compounds, x and y are whole numbers, and the ratio of y to x is no more than 0.5.

In particular, polymer G; in formula I is propylene and the ratio of y to x is in the range 0.01 to 0.1.

The polyketone of the invention is characterized in that it is an alternating copolymer of ethylene and carbon monoxide, into which a firther olefin such as propylene or butylene can be polymerised.

Polyketone polymers with a melting point of 175° C. to 300° C., in particular 210° C. to 270° C., are inserted into the multi-layer composite of the invention. The polymers typically have a limiting viscosity number (LVN), determined in m-cresol at 60° C., of 0.5 dl/g to 10 dl/g, preferably 0.8 dl/g to 4 dl/g.

Polyketone polymers are known from U.S. Pat. No. 4,880,903 and from U.S. Pat. No. 4,843,144.

In addition to layers a) and b) of the invention, the thermoplastic multi-layer composite can include a further layer c). This layer is adjacent layer a) and arranged opposite layer b). Layer c) is also adhesively bonded to layer a). A chemical reaction apparently occurs between the polyamide of the invention with excess amino end groups and the polyketone polymer in the boundary layer. If a polyamide without excess amino end groups is placed against a polyketone layer, then after extrusion, for example, the bonding is not sufficient.

The usual substances and additives, such as flame retardants, stabilisers, plasticizers, processing aids, viscosity improving agents, fillers, in particular for improving conductivity, pigments or the like, can be added to the moulding compound for layers a), b) and c). The amount of that material is such that the desired properties are not seriously affected.

The thermoplastic multi-layer composites can be produced in a single or multi-stage process.

In single-stage extrusion processes, the different melts are normally co-extruded. In a single-stage injection moulding process, the different melts are brought together in a mould and the mould is allowed to cool (multicomponent injection moulding).

In a multi-stage process, a shaped part of one of components a), b) or c) is first produced and then bonded with the remaining components by pressing, injection moulding or extrusion.

The thermoplastic multi-layer composites of the invention are usually highly resistant or act as a barrier to chemical agents, solvents and fuels. Further, the layers are adhesively bonded together, so that thermal expansion or bending or swelling in solvents does not result in separation of the different layers.

The thermoplastic multi-layer composites are used in structural elements, in particular in the electrical engineering, mechanical engineering and automobile industries where the barrier effect of the polyketones are to be combined with the good mechanical properties of polyamides, in particular good cold impact strength or where poor chemical resistance can be compensated for by a polyketone layer.

The following examples illustrate the invention without in any way limiting its scope (examples of the invention compared with non inventive examples).

Materials used

Aliphatic polyketone based on ethylene, carbon monoxide and propylene, hereinafter termed polyketone 1 (PK1).

Melting point: 225° C.
Relative viscosity, 0.5% in m-cresol: 2.20
Melt volume index (MVI), 240° C., 5 kg: 13 cm³/10 min
Polyamide: PA1 PA2, based on lauryl lactam, characterized in the following table:

|  | Melting point (° C.) | Relative viscosity | COOH groups (μeq/g) | NH₂ end groups (μeq/g) | MVI (cm³/10 min) |
|---|---|---|---|---|---|
| PA 1 | 178 | 2.15 | 15 | 45 | 30<br>275° C., 5 kg |
| PA 2 | 178 | 2.25 | 40 | 30 | 20<br>275° C., 5 kg |

These materials were used to produce 8×1 two layer pipes with 0.3 mm of PK internally and 0.7 mm of PA12 externally. The processing temperature was between 230° C. and 240° C. On using a PA12 with an equal number of end groups, the individual layers could be separated. To this end, a spiral cut was made along the outer wall of the pipe. Then a cut was made along the length of the test piece and the two ends thus formed were pulled.

For a PA with an excess of amino groups co-extruded with the PK, the bonding was so strong that the layers could neither be separated mechanically nor separated after storage in FAM B (DIN 51604: 42.25% toluene, 25.35% isooctane, 12.68% diisobutylene, 4.23% ethanol, 15% methanol and 0.5% water) at 60° C. for 1000 hours.

Further, a double layered corrugated pipe of a PK and a PA with an excess number of amino groups was produced, with layers which also could not be separated. The processing temperature was between 230° C. and 240° C.

It is also possible to produce pipes with more than one layer, as long as the order of the two upper layers is retained. In addition to the PA of the invention other compatible PAs or other polymers can be used, which can include the usual additives such as stabilisers, plasticizer, carbon black, impact modifiers and fillers.

The properties of the 8×1 mm double layer pipes of the invention are compared with a polyketone and a plasticized PA12 single layer pipe in the following table. The non inventive double layer pipe was not tested further because of insufficient bonding of the two layers.

|  | Single layer tube PA 12 plasticized | Single layer polyketone tube | Double layer PA 12 polyketone tube |
|---|---|---|---|
| cold impact DIN 7337 | No break | 100% break | No break |
| Burst pressure (bar) | 64 | 90 | 150 |

What is claimed is:

1. A thermoplastic multi-layer composite, the thermoplastic multi-layer composite comprising:
   a first layer that comprises a first moulding compound the first moulding compound based on a polyamide, the polyamide having a ratio of amino to carboxyl end groups greater than 1; and
   a second layer that comprises a second moulding compound, the second moulding compound based on a linear alternating polyketone, the linear alternating polyketone based on carbon monoxide and an ethylenically unsaturated hydrocarbon compound, at least part of the second layer located adjacent and adhesively bonded to at least part of the first layer.

2. The multi-layer composite of claim 1, wherein the ratio of amino to carboxyl end groups in the polyamide is more than 3.

3. The multi-layer composite of claim 1 wherein the carboxyl end groups in the polyamide constitute 15 µeq/g or less.

4. The multi-layer composite of claim 1 wherein the melting point of the polyamide does not exceed 265° C.

5. The multi-layer composite of claim 1 wherein the melting point of the polyamide is between 150° C. and 250° C.

6. The multi-layer composite of claim 1 wherein the polyamide is based on (1) a lactam containing 6 to 12 carbon atoms, an α,ω-aminocarboxylic acid containing 6 to 12 carbon atoms, or a dibasic carboxylic acid containing 2 to 44 carbon atoms and (2) an aliphatic or cycloaliphatic diamine containing 2 to 12 carbon atoms or a dibasic carboxy acid/diamine salt.

7. The multi-layer composite of claim 1 wherein the linear alternating polyketone has recurring units of the following general formula:

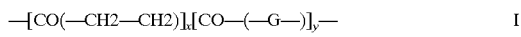

$$-[CO(-CH_2-CH_2)]_x[CO-(-G-)]_y- \qquad I$$

where G is derived from an α-olefin monomer containing at least three carbon atoms which are bonded together with at least one or more ethylenically unsaturated bonds, x and y are whole numbers, and the ratio of y to x is no more than 0.5.

8. The multi-layer composite of claim 7 wherein G in formula I is propylene and the ratio of y to x is in the range 0.01 to 0.1.

9. The multi-layer composite of claim 7 wherein the linear alternating copolymer is formed from ethylene and carbon monoxide.

10. The multi-layer composite of claim 1, the multi-layer composite further comprising a third layer, the third layer located adjacent to and adhesively bonded to the first layer, with the second layer and the third layer located on opposing sides of the first layer.

11. The multi-layer composite of claim 10 wherein the third layer comprises a third moulding compound, the third moulding compound based on a polyamide.

12. The multi-layer composite of claim 1 wherein at least the first layer or the second layer is electrically conductive and has a surface resistance of $<10^9$ ohms.

13. The multi-layer composite of claim 1 wherein the multi-layer composite is in the form of a hose or a pipe having an interior surface that defines an aperture through the hose or pipe, the interior surface formed by the second layer, and the first layer separated from the aperture by the second layer.

14. The multi-layer composite of claim 13 wherein the hose or pipe comprises a wall that surrounds the aperture, the wall comprising the first layer and the second layer, and at least a portion of the wall being corrugated.

15. The multi-layer composite of claim 13 wherein the first layer is from 0.2 to 0.8 mm thick and the second layer is from 0.01 to 0.7 mm thick.

16. A use of the thermoplastic multi-layer composite of claim 1, the use comprising producing the thermoplastic multi-layer composite in the form of an article, the article having an interior surface that defines a hollow extending through at least part of the article.

17. The multi-layer composite of claim 1 wherein the melting point of the polyamide is between 175° C. and 240° C.

18. The multi-layer composite of claim 6 wherein the polyamide is (1) aliphatic and partially crystalline or (2) partially aromatic and amorphous.

19. The multi-layer composite of claim 6 wherein the polyamide is polyamide 12.

20. The multi-layer composite of claim 9 wherein the linear alternating copolymer is formed from ethylene, carbon monoxide, and an additional olefin.

21. The multi-layer composite of claim 20 wherein the additional olefin is propylene or butylene.

22. The multi-layer composite of claim 11 wherein the third moulding compound is based on polyamide 12.

23. The multi-layer composite of claim 1 wherein thermal expansion of the first layer or thermal expansion of the second layer is incapable of causing separation of any part of the second layer that is adhesively bonded to any part of the first layer.

24. The multi-layer composite of claim 1 wherein bending of the first layer or bending of the second layer is incapable of causing separation of any part of the second layer that is adhesively bonded to any part of the first layer.

25. The multi-layer composite of claim 1 wherein swelling of the first layer or swelling of the second layer in solvent is incapable of causing separation of any part of the second layer that is adhesively bonded to any part of the first layer.

26. The multi-layer composite of claim 1 wherein any part of the second layer and any part of the first layer that are adhesively bonded together are incapable of being mechanically separated from each other.

27. The multi-layer composite of claim 1 wherein any part of the second layer and any part of the first layer that are adhesively bonded together are incapable of being separated from each other after storage in FAM B testing fluid (DIN 51,604) for 1,000 hours at a temperature of 60° C., the FAM B testing fluid comprising:

42.25 volume percent toluene;

25.35 volume percent iso-octane;

12.68 volume percent diisobutylene;

4.23 volume percent ethanol;

15 volume percent methanol; and water.

28. The multi-layer composite of claim 1 wherein the polyamide of the first layer and the linear alternating polyketone of the second layer have chemically reacted with each other and wherein:

thermal expansion of the first layer or thermal expansion of the second layer is incapable of causing separation of any part of the second layer that is adhesively bonded to any part of the first layer;

bending of the first layer or bending of the second layer is incapable of causing separation of any part of the second layer that is adhesively bonded to any part of the first layer;

swelling of the first layer or swelling of the second layer in solvent is incapable of causing separation of any part of the second layer that is adhesively bonded to any part of the first layer;

any part of the second layer and any part of the first layer that are adhesively bonded together are incapable of being mechanically separated from each other; or any part of the second layer and any part of the first layer that are adhesively bonded together are incapable of being separated from each other after storage in FAM B testing fluid (DIN 51,604) for 1,000 hours at a temperature of 60° C., the FAM B testing fluid comprising:
42.25 volume percent toluene;
25.35 volume percent iso-octane;
12.68 volume percent diisobutylene;
4.23 volume percent ethanol;
15 volume percent methanol; and
water.

29. The multi-layer composite of claim 1 wherein any part of the second layer and any part of the first layer that are adhesively bonded together are incapable of being separated from each other after storage in FAM B testing fluid for 1,000 hours at a temperature of 60° C., where the FAM B testing fluid is prepared in accordance with German Industrial Standard DIN 51,604.

30. The multi-layer composite of claim 1 wherein the polyamide of the first layer has chemically reacted with the linear alternating polyketone of the second layer.

* * * * *